W. F. JACKSON.
AUTOMOBILE FENDER.
APPLICATION FILED APR. 28, 1915.

1,144,708.  Patented June 29, 1915.

Inventor
W. F. Jackson
By Watson E. Coleman
Attorney

UNITED STATES PATENT OFFICE.

WILLIAM F. JACKSON, OF BRIDGEPORT, ILLINOIS.

AUTOMOBILE-FENDER.

1,144,708.   Specification of Letters Patent.   Patented June 29, 1915.

Application filed April 28, 1915. Serial No. 24,536.

*To all whom it may concern:*

Be it known that I, WILLIAM F. JACKSON, a citizen of the United States, residing at Bridgeport, in the county of Lawrence and State of Illinois, have invented certain new and useful Improvements in Automobile-Fenders, of which the following is a specification, reference being had to the accompanying drawings.

My present invention relates to new and useful improvements in automobile fenders and has particular reference to an improvement in fenders of the type shown in my prior Patent 1,121,727 issued December 22nd, 1914.

One of the principal objects of my invention is to provide an automobile fender which is constructed with such regard to proportion, number and arrangement of parts that it may be cheaply manufactured, will be durable and efficient in service and may be readily applied to or removed from any automobile of standard lines, without requiring any changes or alterations in the construction thereof.

A further and more specific object of the invention is to provide a fender which includes broadly a horizontal section or lapped portion, a vertical wall which extends transversely with respect to the vehicle and a pair of curved wheel guards which are disposed to prevent the person struck, from contacting with the forward wheels of the vehicle.

Another and more specific object of the invention is to improve upon the fender of my prior patent by designing the frame members and braces in such manner that they will more adequately withstand the strains and shocks to which the fender is put when engaging a foreign obstacle.

The above, and other incidental objects of a similar nature which will be hereinafter more specifically treated are accomplished by such means as are illustrated in the accompanying drawings, described in the following specification, and then more particularly pointed out in the claims which are appended hereto and form part of this application.

Figure 1:
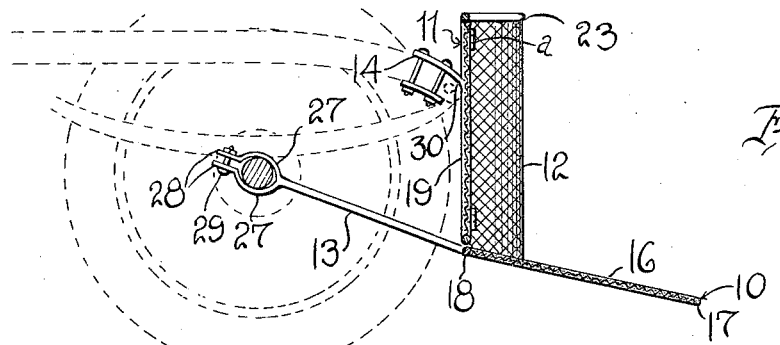
Figure 2:
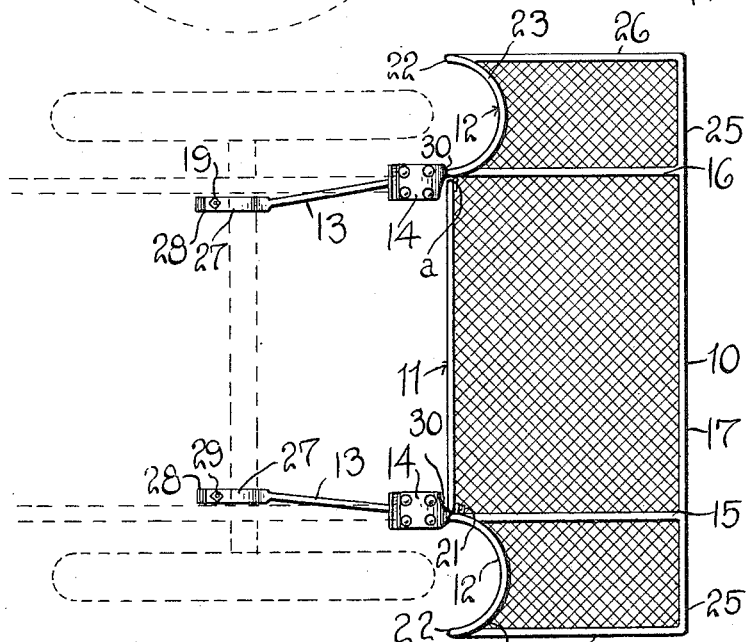
Figure 3:
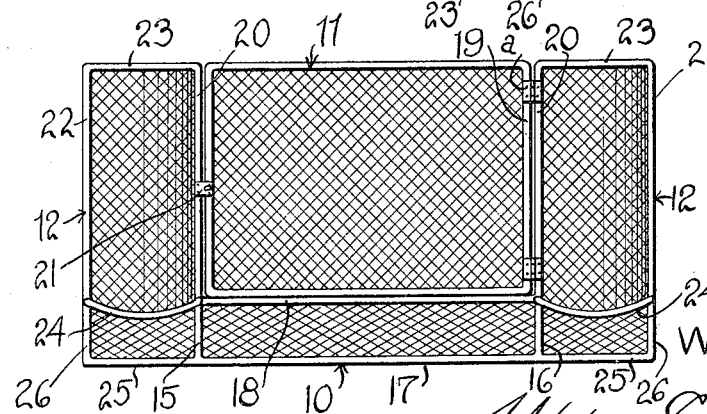

With reference to the drawings, wherein there has been illustrated the preferred embodiment of this invention, as it is reduced to practice, and throughout the several views of which similar reference numerals designate corresponding parts, Figure 1 is a vertical section taken through the fender in a plane extending longitudinally with respect to the vehicle; Fig. 2 is a top plan view; and Fig. 3 is a front elevation.

As embodied in the accompanying drawings, the improved fender includes generally a horizontal section or lap portion 10, a vertical section 11, a pair of wheel guards 12, and pairs of attaching brackets 13 and 14 which are respectively applied to the forward axle and side bars of the vehicle chassis.

The horizontal section consists of a substantially rectangular body frame defined by the transverse rods 15 and 16 and the longitudinal rods 17 and 18 and a sheet of reticulated material, preferably wire cloth which is tightly stretched within the frame. The vertical wall 11 includes a rectangular frame 19, one vertical member of which is secured as by hinges A to a vertical rod 20 of one of the wheel guard frames, as best disclosed in Fig. 3. The free end of the vertical wall is normally secured in position by a spring latch indicated at 21. This latch, is designed to prevent the door from swinging toward the engine. The vertical section is, however, adapted to swing as a door away from the vehicle, in order that access may be had to the crank.

The wheel guards each consist of a frame having a pair of vertical parallel rods 20 and 22 which are connected at their upper and lower terminals by a substantially U-shaped bar, as at 23 and 24. The wire cloth or other reticulated material is applied to this frame, being tightly stretched thereon, obviously prevents the contact of a person struck, with the wheel, since the frame is so located that the vertical rods are disposed in the rear of the forward limits of the wheel.

The frame of the horizontal section is extended laterally at its terminals, as indicated at 25 and is then bent rearwardly and at right angles, as at 26 and connected to the lower end of the outer vertical rod 22 of the adjacent wheel guard. The sections of wire cloth are also stretched on each of the frames defined by the members 17, 25, 26 and 24.

The attaching brackets 13 extend rearwardly and at a slight upward angle from the terminals of the frame member 16 and are provided at their free ends with clamping rings adapted to engage about the forward axle of the vehicle. Each clamping ring consists of two substantially semi-circular members 27 on the outer ends of which are formed apertured ears 28. Clamping bolts 29 are passed through these ears for clamping the members 28 about the axle. The attaching brackets 14 are formed in the nature of flat plates which are secured upon the upper portions of the vehicle springs or to the side member of the automobile chassis, by U bolts. The forward ends of these members 14 are reduced in width and are bent downwardly, as at 30 and are welded or otherwise secured to the members 11.

From the foregoing description, it will be seen that the fender may be readily attached to a vehicle by securing the brackets 13 and 14 to the axle and springs or chassis thereof and that when the fender is properly positioned, it will thoroughly guard against the striking of a pedestrian by the wheels or body of the vehicle. It is preferable that the horizontal section of the fender be inclined downwardly toward its forward end, as disclosed in Fig. 1 so that when a pedestrian is struck, he will be hit about the ankles and thrown from his feet upon the horizontal section of the fender.

In reduction to practice, it has been found that the form of this invention illustrated in the drawings, and referred to in the above description as the preferred embodiment is the most efficient and practical; yet realizing that the conditions concurrent with the adoption of this device will necessarily vary, it is desirable to emphasize the fact that various minor changes in the details of construction, proportion and arrangement of parts may be resorted to, when required, without sacrificing any of the advantages of this invention, as defined by the appended claims.

What is claimed is:—

1. In a vehicle fender, a lap frame, reticulated material covering the frame, transverse extensions formed on the lap frame, reticulated material covering the extensions, transversely curved vertical wheel guards rising from the rear ends of the extensions, a vertical section disposed between the wheel guards and behind the lap frame, said wheel guards being disposed with their rear edges in the plane of the vertical section and being disposed in advance of the front wheels of the vehicle, and means for securing the fender to a vehicle.

2. In a vehicle fender, a lap frame, reticulated material covering the frame, transverse extensions formed on the lap frame, reticulated material covering the extensions, transversely curved vertical wheel guards rising from the rear ends of the extensions, a vertical section disposed between the wheel guards and behind the frame, and means for securing the fender to a vehicle, said means including a pair of attaching plates extending rearwardly from the wheel guards for attachment to the vehicle chassis, and a pair of bracket arms extending rearwardly from the lap frame and engageable with the vehicle axle.

In testimony whereof I hereunto affix my signature in the presence of two witnesses.

WILLIAM F. JACKSON.

Witnesses:
JOHN DATT,
LOUIS COX.

Copies of this patent may be obtained for five cents each, by addressing the "Commissioner of Patents, Washington, D. C."